Oct. 5, 1954
R. L. GILLIAM
2,690,916
CONTROL MEANS FOR TRACKING TANDEM AXLES
Filed July 17, 1952
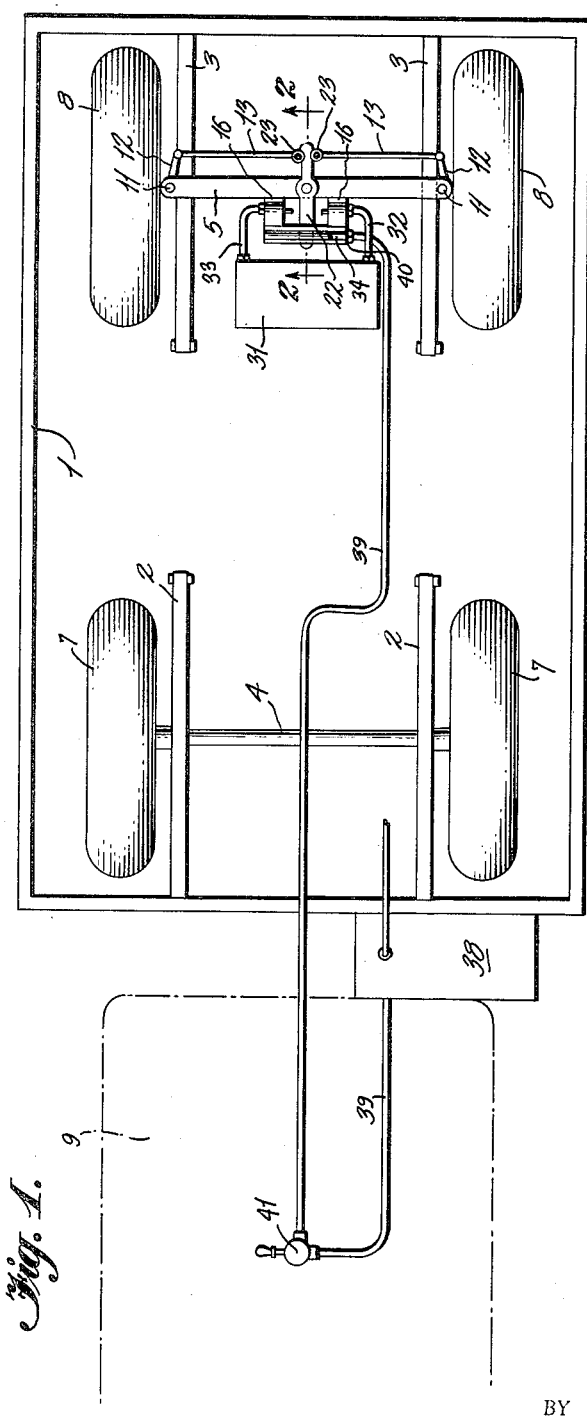
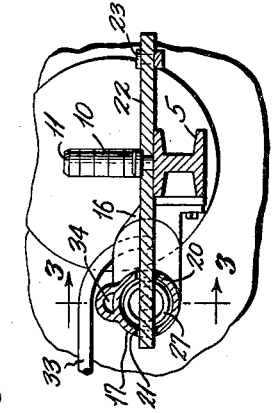
INVENTOR
*Robert L. Gilliam*
BY *Mason, Fenwick & Lawrence*
ATTORNEYS Patented Oct. 5, 1954

2,690,916

UNITED STATES PATENT OFFICE 2,690,916

CONTROL MEANS FOR TRACKING TANDEM AXLES

Robert L. Gilliam, South Boston, Va.

Application July 17, 1952, Serial No. 299,353

7 Claims. (Cl. 280—81)

1

This invention relates to road vehicles of the known type, having tandem rear axles in fixed parallelism with the wheels on the posterior axle having some freedom of dirigibility to permit said wheels to track with the wheels of the anterior axle. If the wheels of the posterior axle were constrained to rotate in planes parallel to the anterior wheels, the unit constituted by both rear axles would drag sidewise when the vehicle turns, resulting in rapid wearing out of the tires.

There are, however, times when the wheels of the posterior axle should not be free to direct themselves. For example, when the vehicle is traveling with the wheels in a rut and it is desired to turn the vehicle out of the rut, the rut would take charge of the dirigible wheels and they would continue to travel forward in the rut after the vehicle had assumed quite an angle to the direction of movement of the wheels, the attempt to pull them out of the rut resulting in great strain upon the wheels and the parts associated therewith. Again, in backing the vehicle up over a curb at an angle thereto, the dirigible wheels would line up at right angles to the curb, making it necessary to ride both wheels simultaneously up over the curb with the vehicle at a disadvantageous angle with respect to the axes of said wheels.

One of the objects of the present invention is to provide in a vehicle of the type described, automatic means operative responsive to excess deflection of the dirigible wheels, that is, deflection beyond a determined range of normal free movement adequate to permit tracking, for forcing said wheels back into positions of no deflection, and thereafter restoring their range of normal free movement when the cause of excessive deflection has become dispelled.

Another object of the invention is the provision of manually operable means for locking the dirigible wheels in positions of no deflection for as long a period as may be desired.

Other objects of the invention will appear as the following description of a preferred and practical embodiment thereof proceeds.

In the drawing throughout the figures of which the same reference characters have been used to denote identical parts:

Figure 1 is a plan view of a vehicle of the semi-trailer type, shown somewhat diagrammatically, incorporating the principles of the invention;

Figure 2 is a section taken along the line 2—2 of Figure 1;

Figure 3 is a section taken along the line 3—3 of Figure 2;

2

Figure 4 is a section taken along the line 4—4 of Figure 3;

Figure 5 is a section taken along the line 5—5 of Figure 4.

Referring now in detail to the several figures, the invention is illustrated by a vehicle of the semi-trailer type which is more or less diagrammatically shown, the chassis frame being designated as 1, which carries pairs of longitudinal leaf springs 2 and 3, upon which the rear axles 4 and 5 are mounted transversely in fixed parallelism. Vehicle wheels 7 and 8 are on the respective axles. The semi-trailer is detachably secured to the cab unit 9 by means not shown, which carries the power plant, including the driving means for the vehicle.

The wheels 7 are mounted on a fixed axis, while the wheels 8 associated with the posterior of the two rear axles are conventionally mounted in steering knuckles 10, pivotally connected to the ends of the posterior axle 5 by the king bolts 11. Each steering knuckle has the customary steering arm 12. Said steering arms are connected by linkage which includes the links 13 of equal length, and by means of which the wheels 8 simultaneously move in the same phase when deflected. Dirigible wheels of this type will freely track with respect to the anterior wheels 7. This is, of course, a useful and essential attribute in the interest of minimizing tire wear, as has been already pointed out, but it is desirable that the free deflection of the wheels be kept within bounds, in the interest of road safety as well as efficiency in the operation of the vehicle. The examples given refer only to a few of the instances in which it is highly desirable to have automatic means to control excessive deflection of the dirigible wheels and manual means for suppressing dirigibility altogether.

The means that I have provided for accomplishing these purposes is linked to the pneumatic system which either directly or indirectly serves the brakes of the vehicle, and which essentially comprises a storage tank 38 for compressed air kept replenished by an engine driven compressor, not shown. The instrumentality which I have devised for purpose of illustrating the operation of the invention comprises a fitting secured to the middle portion of the posterior axle by means such as the brackets 16 shown in Figure 2. Said fitting comprises a transverse tubular portion 17, the end parts of which form cylinders 18 and 19, and the middle portion of which is provided with horizontal slots 20 and 21. A lever 22 is pivotally mounted at an intermediate point on the posterior axle 5 at the middle of the latter, to rotate in a horizontal plane. The rear end of said lever has eyes 23 at its opposite sides, to which the links 13 are connected. This causes the lever to oscillate in phase with the deflections of the dirigible wheels. The opposite end of said lever plays in the slots 20 and 21, intersecting the tubular portion of the fitting 14.

Plungers 24 are fitted in the cylinders 18 and 19, having rods 25 which pass freely through central holes in partitions 26 fixed at the inner ends of said cylinders. The length of stroke of the plungers and the length of the rods 25 are such that the rods make contact with the lever 12 when the plungers are at the outer limits of their strokes. Helical springs 27 of equal length and strength occupy the middle part of the tubular portion of the fitting 14, being under some compression between the partitions 26 and the end of the lever. The latter may, therefore, be said to normally float between the springs in mid position, in which position the dirigible wheels are in a position of no deflection. The strength of the springs is such that while the lever thus floats, the wheels can freely deflect so as to track with the anterior wheels and also to pass ordinary road inequalities and obstructions.

The fitting 14 is provided with extensions 28 on opposite sides of the lever 12, and spaced therefrom. Said extensions are bored to provide air passages 29 and 30, said passages communicating with the respective cylinders 18 and 19 adjacent their head ends, and communicating with an auxiliary compressing air reservoir 31 by separate pipes 32 and 33. The cylinders 18 and 19 are in permanent intercommunication through a passage 34 formed in the fitting 14, so that when air is admitted to either cylinder it is admitted to both. The passage 34 has a bleed port 35 communicating with atmosphere. The passages 29 and 30 in the extensions 28 are controlled by normally closed check valves 36 and 37. Said check valves are provided with stems or depressors 38 which pass slidably through bores in said extensions and terminate a short distance from the lever 12 at opposite sides thereof. The distance between said depressors and said lever is such that during the normal range of oscillation of said lever representing the normal range of deflections of the dirigible wheels, said depressors are out of contact with said lever, but when excess deflections of the dirigible wheels takes place, one or the other of said depressors is contacted by said lever and pushed in, unseating the corresponding valve and admitting air to both cylinders. This causes the plungers to move inwardly, projecting the rods 25 simultaneously. That rod which is closest to the lever will contact it, moving it to mid position, and the other rod will keep it from moving beyond mid position. As soon as the factor which caused the excess deflection has been dispelled, whether it be a large obstruction in the road or a rut in which one or both of the wheels may be engulfed, the normal freedom of oscillation of the wheels is restored by the bleeding of the pressure from the cylinders to atmosphere by way of the port 35.

Manual control of the dirigible wheels is obtained through the conduit 39 which extends from the reservoir 14 through the cab, and is connected to either of the cylinders or to the passage 34. It is shown as being connected to the cylinder 18 at the point 40. A manual valve 41 in the cab controls this conduit. When said valve is opened, compressed air enters both cylinders, moving the plungers 24 and rods 25 into locking position with respect to both sides of the lever 12, which may be maintained locked so long as the valve 41 is held open. When it is desired to relinquish locking pressure upon said lever, the valve is closed and the air bleeds out of the port 35.

While either of the valves 36 or 37 is open in the automatic operation of the device, the auxiliary reservoir 31 is in communication with the main air tank 14 and replenished with fluid under pressure therefrom.

While I have in the above description disclosed what I believe to be a practical embodiment of the invention, it will be understood by those skilled in the art that the specific details of construction and the arrangement of parts are by way of example and not to be construed as limiting the scope of the invention, and that other fluids than air under pressure may be employed in the operation of the system.

What I claim is:

1. In a road vehicle of the type having tandem parallel rear axles with dirigible wheels at the ends of the posterior of said axles normally having freedom to oscillate within a determined range to enable them to track with the wheels at the ends of the anterior of said axles, control means operable responsive to deflections of said dirigible wheels in either direction beyond said range, for restoring said wheels to a position of no deflection, and means automatically operable subsequent to the operation of said control means for dispelling the control effect of said control means.

2. In a road vehicle of the type having transverse parallel rear axles with dirigible wheels at the ends of the posterior of said axles normally having freedom to oscillate within a determined range to enable them to track with the wheels at the ends of the anterior of said axles, control means operable responsive to deflections of said dirigible wheels in either direction beyond said range, for moving them to a position of no deflection, means actuable at will for operating said control means to hold said dirigible wheels in said position of no deflection during the continued actuation of said actuable means, and means automatically operable to dispel the effect of said control means.

3. In a road vehicle of the type having tandem parallel rear axles with dirigible wheels at the ends of the posterior of said axles, having linkage connecting them whereby they swing in the same phase, and normally having freedom to oscillate within a determined range to enable them to track with the wheels at the ends of the anterior of said axles, a lever pivoted to swing horizontally having one end connected to said linkage whereby said lever oscillates responsive to the deflection of said dirigible wheels, springs at opposite sides of said lever yieldingly maintaining it in a mid position corresponding to the position of no deflection of said dirigible wheels, a fluid pressure system for controlling said dirigible wheels comprising a source of fluid pressure, fixed intercommunicating cylinders at opposite sides of said lever communicating with said source, plungers in said cylinders having rods directed toward said lever normally spaced apart at their ends a sufficient distance to be out of contact with said lever in its normal range of oscillation, normally closed valve means controlling communication of said cylinders with said source, depressors for unseating said valve means, at both sides of said lever alternatively contacted thereby under deflections of said lever beyond its normal range for activating said plungers and rods to return said lever to its mid position.

4. In a road vehicle as claimed in claim 3, said system including a manually controlled cutoff valve in bypassing relation to said depressor opened valve means whereby said lever may be held in mid position at will, as long as said cutoff valve is kept open.

5. In a road vehicle of the type having tandem parallel rear axles with dirigible wheels at the ends of the posterior of said axles, having linkage connecting them whereby they swing in the same phase, and normally having freedom to oscillate within a determined range to enable them to track with the wheels at the ends of the anterior of said axles, a lever pivoted to swing horizontally having one end connected to said linkage whereby said lever oscillates responsive to the deflection of said dirigible wheels, springs at opposite sides of said lever yieldably maintaining it in a mid position corresponding to the position of no deflection of said dirigible wheels, a fluid pressure system for controlling said dirigible wheels comprising a source of fluid pressure, fixed cylinders at opposite sides of said lever, a conduit maintaining said cylinders in intercommunication, said cylinders communicating with said source, plungers in said cylinders having rods directed toward said lever normally spaced apart at their ends a sufficient distance to be out of contact with said lever in its normal range of oscillation, normally closed valve means controlling communication of said cylinders with said source, depressors for unseating said valve means at both sides of said lever alternatively contacted thereby under deflection of said lever beyond its normal range for activating said plungers and rods to return said lever to mid position, said conduit being provided with a bleed passage for dispelling the effect of said control means.

6. In a road vehicle of the type having tandem parallel rear axles with dirigible wheels at the ends of the posterior of said axles, having linkage connecting them whereby they swing in the same phase, and normally having freedom to oscillate within a determined range to enable them to track with the wheels at the ends of the anterior of said axles, a lever pivoted to swing horizontally having one end connected to said linkage whereby said lever oscillates responsive to the deflection of said dirigible wheels, springs at opposite sides of said lever yieldably maintaining it in a mid position corresponding to the position of no deflection of said dirigible wheels, a fluid pressure system for controlling said dirigible wheels comprising a source of fluid pressure, fixed cylinders at opposite sides of said lever, a conduit maintaining said cylinders in intercommunication, said cylinders communicating with said source, plungers in said cylinders having rods directed toward said lever normally spaced apart at their ends a sufficient distance to be out of contact with said lever in its normal range of oscillation, normally closed valve means controlling communication of said cylinders with said source, depressors for unseating said valve means at both sides of said lever alternatively contacted thereby under deflection of said lever beyond its normal range for activating said plungers and rods to return said lever to mid position, said system including a manually controlled cutoff valve in bypassing relation to said depressor opened valve means whereby said lever may be held in said mid position at will as long as said cutoff valve is kept open, said conduit being provided with a bleed passage for dispelling the effect of said control means.

7. In a road vehicle of the type having tandem parallel rear axles with dirigible wheels at the ends of the posterior of said axles, normally spring restrained to maintain positions coaxially parallel to said axle, said wheels normally having a range of deflection solely under said spring restraint enabling them to track with the wheels at the ends of the anterior of said axles under road stresses imposed thereupon in excess of said spring restraint, means responsive to deflections of said dirigible wheels beyond said range, dominating said spring restraint for restoring said dirigible wheels to positions of no deflection.

References Cited in the file of this patent

FOREIGN PATENTS

| Number | Country | Date |
|--------|---------|------|
| 667,667 | Great Britain | Mar. 5, 1952 |